United States Patent [19]
Jelden et al.

[11] Patent Number: 5,592,815
[45] Date of Patent: Jan. 14, 1997

[54] PROCESS FOR MONITORING THE CONVERSION RATE OF AN EXHAUST CATALYST

[75] Inventors: Hanno Jelden, Lehre; Winfried Schultalbers, Meinersen; Thomas Bizenberger, Braunschweig, all of Germany

[73] Assignee: Volkswagen AG, Wolfsburg, Germany

[21] Appl. No.: 527,786

[22] Filed: Sep. 13, 1995

[30] Foreign Application Priority Data

Nov. 11, 1994 [DE] Germany ............... 44 40 276.7

[51] Int. Cl.⁶ ...................................... F01N 3/00
[52] U.S. Cl. ........................... 60/274; 60/277
[58] Field of Search ........................ 60/277, 274

[56] References Cited

U.S. PATENT DOCUMENTS 5,133,184 7/1992 Geiger .
5,435,172 7/1995 Pelters et al. ................. 60/277 X

FOREIGN PATENT DOCUMENTS

| | | |
|---|---|---|
| 4100397A1 | 8/1991 | Germany . |
| 4122787A1 | 1/1992 | Germany . |
| 4227207A1 | 2/1994 | Germany . |
| 0008221 | 1/1979 | Japan ................ 60/277 |
| 0162339 | 9/1984 | Japan ................ 60/277 |
| 94-04800 | 3/1994 | WIPO . |

*Primary Examiner*—Hoang Nguyen
*Attorney, Agent, or Firm*—Brumbaugh, Graves, Donohue & Raymond

[57] ABSTRACT

For continuous and accurate monitoring of the conversion rate of an exhaust catalyst during operation of an internal combustion engine, temperature values are determined at two measuring points upstream and downstream of the catalyst in the direction of exhaust gas flow. In order to obtain an evaluatable signal difference at all times, at least one of the measured exhaust gas temperature values is filtered so that the temperature value obtained assures a reliable temperature difference with respect to the other temperature value at all times. The actual temperature difference value obtained in this way is compared with a desired temperature difference value generated by a three-dimensional desired value characteristic map and is checked with the aid of a plausibility check.

9 Claims, 2 Drawing Sheets

5,592,815

1

PROCESS FOR MONITORING THE CONVERSION RATE OF AN EXHAUST CATALYST

BACKGROUND OF THE INVENTION

This invention relates to processes for monitoring the exhaust gas conversion rate of an exhaust catalyst for an internal combustion engine.

German Patent No. 41 00 397 discloses a process for monitoring the exhaust gas conversion rate of a catalyst for an internal combustion engine in which temperature values are determined at at least two points in the exhaust line during operation of the engine and compared in a control unit to obtain a monitoring signal. The process disclosed in this patent is based on the so-called disturbance-variable principle in which an abnormal operating condition is deliberately produced in a specific operating mode of the internal combustion engine. In the described process the abnormal operating condition is an overrun phase of the internal combustion engine produced by the generation of misfires and by the supply of a defined fuel/air mixture to produce a reaction at the catalyst. To obtain a monitoring signal, the chemical reaction of the catalyst to this mixture is evaluated from the temperature values recorded in the exhaust line.

SUMMARY OF THE INVENTION

Accordingly, it is an object of the present invention to provide a process for monitoring the exhaust gas conversion rate of an internal combustion engine which overcomes the disadvantages of the prior art.

Another object of the invention is to provide a process for monitoring the exhaust gas conversion rate of an exhaust catalyst during operation of an internal combustion engine without being limited to particular operating conditions of the internal combustion engine.

These and other objects of the invention are attained by continuously detecting exhaust gas temperature values upstream and downstream of at least a portion of an exhaust gas catalyst, filtering at least one of the upstream and downstream temperature values to eliminate short-term variations therein, determining the difference between the filtered value and the other of the upstream and downstream temperature values, comparing the determined temperature difference value with a desired temperature difference value for the operating conditions of the engine, and initiating a monitoring signal when the determined temperature difference value remains above the desired temperature difference value for a selected period of time.

The process according to the invention is thus based on the recognition that, when the exhaust gas catalyst is fully active, the temperature of the exhaust gas is increased in the catalyst by a certain amount, for example 30° C. If this temperature difference does not occur, it can be concluded that the exhaust catalyst is defective or is no longer operating at its full conversion rate. By observing the time characteristics of temperature values upstream and downstream of the exhaust catalyst during the operation of the internal combustion engine, it can be shown that, although there is as a rule a temperature difference susceptible of evaluation upstream and downstream of the catalyst, this temperature difference is, for various reasons, not achieved at certain times even though the catalyst is not defective.

To eliminate one of these reasons according to the invention, at least one of the continuously detected temperatures upstream or downstream of the catalyst is supplied to a filter which eliminates short-term fluctuations by averaging over a period of time. The temperature difference is then determined from this filtered signal and the other of the upstream and downstream temperature values. In order to ensure accurate and reliable monitoring, this temperature difference value is compared with a desired temperature difference value which is determined from a desired-value characteristic map memory supplied continuously with the certain operating condition variables, i.e., speed of the internal combustion engine, exhaust temperature in the exhaust line and the fuel injection rate to the internal combustion engine. The desired temperature difference value determined from this characteristic map memory is then supplied to a filter which eliminates short-term variations by time averaging and the result is compared with the determined temperature difference value. In order to obtain a reliable result when the determined temperature difference is below the desired temperature difference, it is then ascertained whether this condition has existed for a selected period of time which is dependent on the current exhaust gas temperature and, if this is the case, a monitoring signal is triggered.

This process advantageously permits continuous monitoring of the catalyst during engine operation with high accuracy and reliability. Moreover, the process is not limited to particular operating conditions of the internal combustion engine and can therefore be carried out at any time during engine operation. Filtering of either or both of the exhaust gas temperature values assures that the upstream-to-downstream temperature difference can be determined in a reliable manner, while the three-dimensional desired-value characteristic map which processes the engine operating condition variables permits measurement under any engine operating condition.

In an advantageous modification, the process includes a plausibility check which comprises a number of criteria and may prevent initiation of the monitoring process or lead to termination of the process. Thus, following the cold starting of the internal combustion engine, the exhaust gas temperature value must have reached the startup temperature value of the catalyst at least once. The second exhaust gas temperature value in the exhaust line, downstream of the catalyst, is preferably used as the current temperature value in the exhaust line. The requirement that this temperature value exceed the startup temperature assures that any triggering of the monitoring signal occurs only at the catalyst operating temperature.

A check is also made to determine whether the current exhaust gas temperature is below a catalyst shutdown temperature, from which it must be assumed that the catalyst has not yet reached its startup temperature. The value for the startup temperature is above the value for the catalyst shut-down temperature, there being a hysteresis between the two values.

Termination of the catalyst monitoring process can be carried out by setting the time window which is determined as a function of the current exhaust gas temperature to a value of infinity. In a preferred embodiment, particularly accurate matching between the actual temperature difference determined and the desired temperature difference is possible by providing the desired-value characteristic map memory with a desired-value characteristic map in which the input variables comprise the speed of the internal combustion engine and the current exhaust gas temperature and from which a desired-temperature difference value is read out. This desired temperature difference value is then corrected by multiplying it by an output value from another correction characteristic map which receives as input variables the speed of the internal combustion and the fuel injection rate.

It is also advisable for the monitoring procedure to be terminated if the filtered desired temperature difference value is below a specified threshold temperature value. This avoids a situation where, for example, the desired temperature difference values specified are so small that, for example they lie within the range of possible inaccuracy of measurement of the determined temperature values.

In a preferred process the first and second exhaust gas temperature values determined continuously in the exhaust line and the value read out from the desired value characteristic map memory are each supplied to a filter designed as a low pass filter which eliminates short-term variations by time averaging. Different filter time constants are preferably used for increasing and decreasing temperature or temperature difference values. By suitable configuration of these filter time constants, it is possible to employ the procedure in an optimum way, even in the case of greatly fluctuating, i.e. non-steady state operating conditions.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
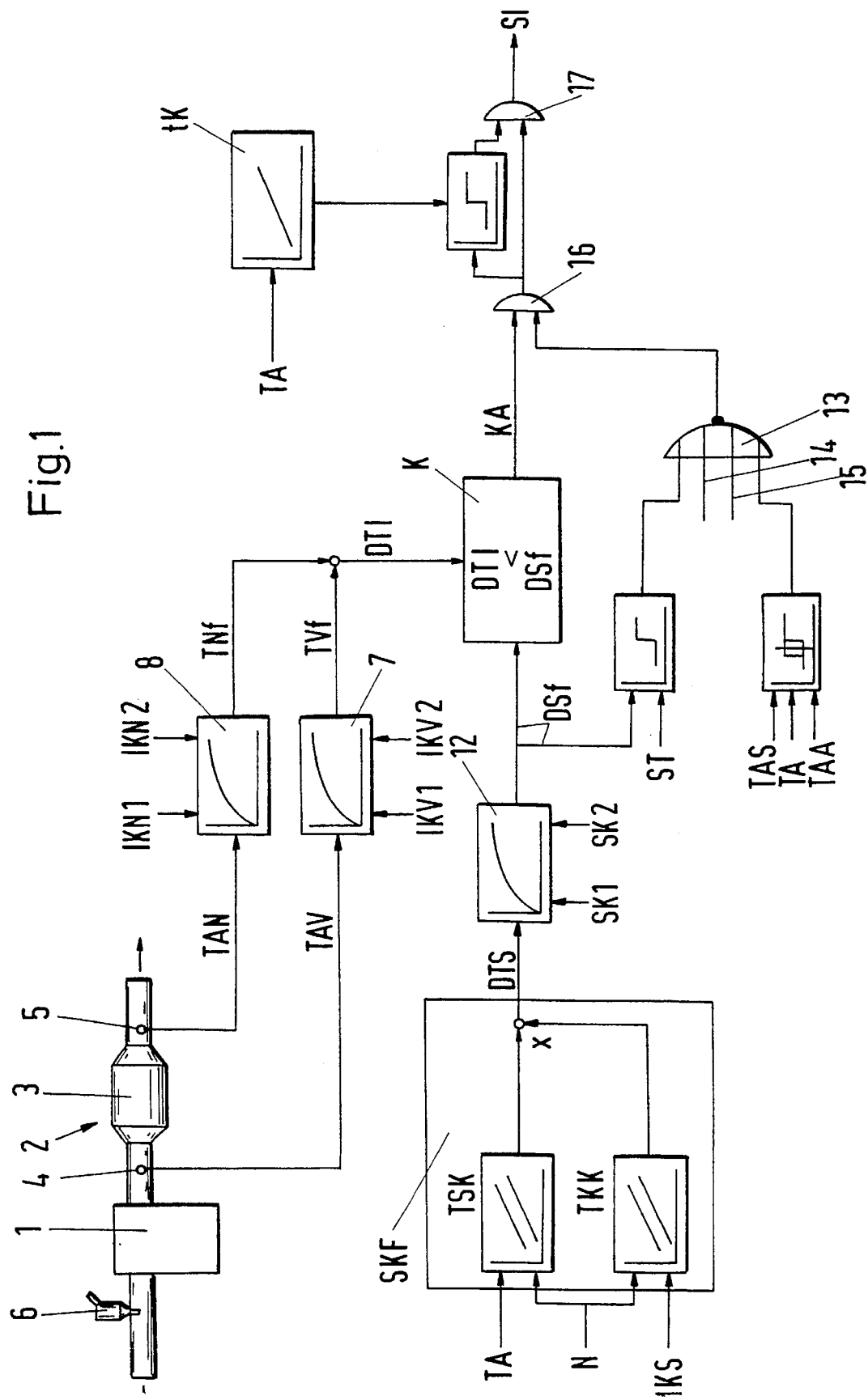
FIG. 1 is a schematic black diagram illustrating a representative embodiment of a catalyst conversion monitoring system according to the invention.

In the typical embodiment of the invention illustrated schematically in FIG. 1, an internal combustion engine 1, which may be a Diesel engine, supplies exhaust gas through an exhaust line 2 to an exhaust catalyst 3 which operates as an oxidation catalyst.

Arranged in series in the exhaust line 2 on opposite sides of the catalyst 3 in the direction of flow of the exhaust gas are an upstream measuring point 4 and a downstream measuring point 5. A first exhaust gas temperature value TAV is determined at the measuring point 4 and a second exhaust gas temperature TAN is determined at the measuring point 5. During the operation of the internal combustion engine these values are continuously recorded, preferably together with the two temperature values TAV and TAN, and signals representing the speed N of the internal combustion engine 1, the injection rate of fuel MKS being injected via an injection device 6 and the exhaust gas temperature TA are supplied to a control unit of the internal combustion engine. Only relevant components of the control unit are illustrated in FIG. 1. The value TAN determined at measuring point 5 is used as the current exhaust gas temperature TA.

In the control unit, the exhaust gas temperature values TAV and TAN are supplied respectively to two filters 7 and 8 which are designed as low pass filters to eliminate short-term temperature value fluctuations by averaging the temperature signals over a selected time period. These time periods have a filter time constant IKV1 and IKN1 for the filters 7, and 8, respectively, for increasing values of TAV and TAN, for example during acceleration phases of the internal combustion engine 1. For decreasing values of TAV and TAN, second filter time constants IKV2 and IKN2 are applicable. In a representative embodiment, the value of IKV1 is about twenty times that of IKN1 and the value of IKV2 is approximately 15 times the value of IKN2. After filtering, the filtered temperature values TVf and TNf appear at the outputs of the actual-value filters 7 and 8 respectively. An actual temperature difference DTI is then produced from these two values in the control unit.

Figure 2:
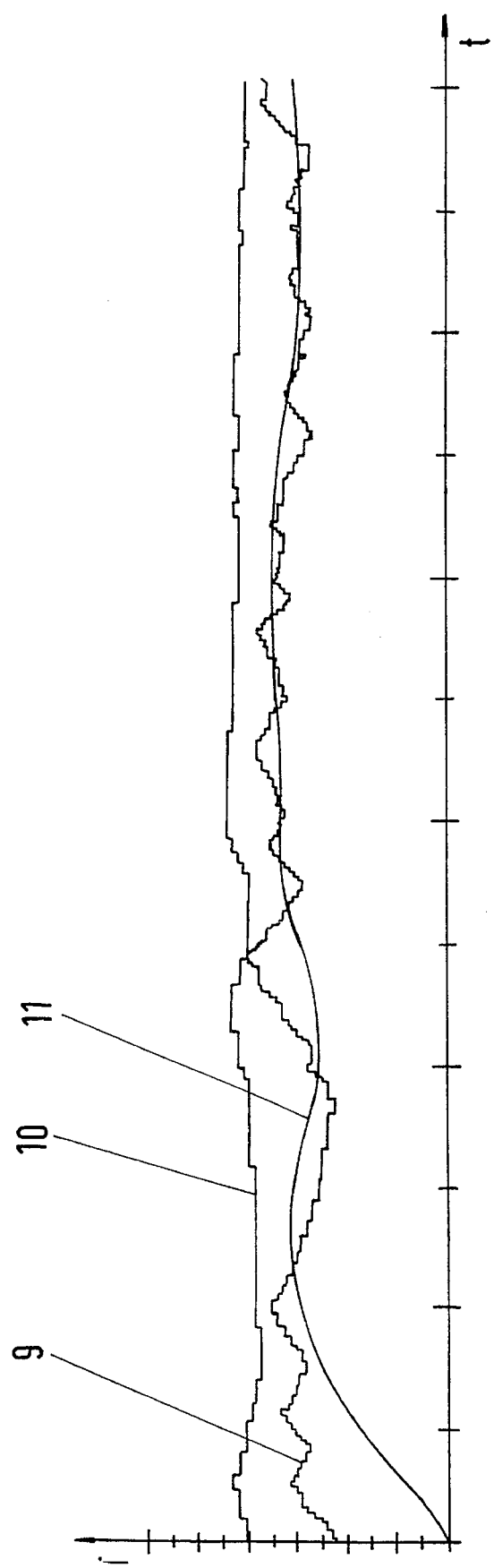
FIG. 2 is a graphical representation showing the variation with time of measured temperature values and filtered temperature values in a catalyst monitoring system according to the invention.

FIG. 2 includes a line 9 illustrating the variation with time of the exhaust gas temperature TAV determined at the upstream measuring point 4 and a line 10 showing the corresponding temperature variation of TAN at the downstream measuring point 5. A comparison of these lines clearly illustrates the higher values downstream of the catalyst 3 caused by the exothermic reaction in the catalyst. Also clear, however, is the overall irregular shape, particularly of curve 9. As a result, there is not always a usable difference between lines 9 and 10. A line 11 in FIG. 2 represents the filtered value TVf of the first exhaust gas temperature TAV detected upstream of the catalyst 3. With such filtering of short term variations, the temperature difference between the filtered characteristic 11 and characteristic 10 is usable at all times.

To determine a desired temperature value DTS for comparison with the actual temperature difference value DTI, the control unit also contains a desired-value characteristic map memory SKF. This memory map has, as input variables, the exhaust gas temperature TA, the speed N of the internal combustion engine, and the injection rate of fuel MKS. The exhaust-gas temperature TA and the speed N are fed to a desired value characteristic map TSK, from which a desired temperature difference is read out as a function of the input variables. The desired value characteristic map memory SKF also includes a correction characteristic map TKK, which is supplied with the speed N and injection rate of fuel MKS and from which a correction factor is read out as a function of those two input variables. This correction factor is modified by multiplying it by the desired temperature difference read out from the desired value characteristic map TSK to produce the desired temperature difference DTS.

The desired temperature difference DTS is thus available at the output of the desired value characteristic map memory SKF and this difference is then converted in a low pass filter 12, which eliminates short-term variations by time averaging, into a desired value filter output value DSf. This desired value filter 12 operates with a first desired value filter time constant SK1 for values of DTS with an increasing time characteristic and operates with a second desired value filter time constant SK2 for decreasing values of DFS.

The values of DTI and DSf are then compared in a comparator K. If the desired value filter output value DSf is higher than the actual temperature difference value DTI, a comparator output value KA is "on" and otherwise it is "off". A current time window of a particular duration is read out from a time characteristic map tK as a function of the current exhaust gas temperature TA. To trigger a monitoring signal SI, the comparator output value KA must be present at least for the duration of the current time window.

In order to prevent triggering of the monitoring signal SI in the presence of unreasonable boundary conditions, a number of plausibility check criteria are required to be met before the signal SI can be triggered. For example, the filtered desired temperature difference signal DSf is compared with a predetermined threshold temperature ST stored in the control unit. This temperature is a shutdown threshold and is in a range of a few degrees Celsius, for example 2° C.

A check is also made to determine whether the exhaust gas temperature TA has exceeded a catalyst startup temperature value TAS, for example 200° C., at least once and whether the exhaust gas temperature TA is below a catalyst shutdown temperature TAA of, for example, 140° C. When TAS has been exceeded, the plausibility check is possible, but if the temperature is below TAA the plausibility check is prevented. The outputs described above are processed in a NOR circuit 13 which, through an input 14, detects the ability of the temperature sensors arranged at the measuring points 4 and 5 to function and, through an input 15, monitors an output stage of the control unit. The output of the NOR circuit 13 is combined in a first AND circuit 16 with the comparator output value KA, and the output of the circuit 16 is, on the one hand, fed directly to a second AND circuit 17 and, also passes through the time window read out from the time characteristic map TK after which it is supplied to the second AND circuit 17. Thus, if the desired temperature difference has been above the actual temperature difference for the required time period and the criteria processed by the circuit 13 have been satisfied, the trigger signal S1 will be initiated.

Although the invention has been described herein with reference to specific embodiments, many modifications and variations therein will readily occur to those skilled in the art. Accordingly, all such variations and modifications are included within the intended scope of the invention.

We claim:

1. A process for monitoring the conversion rate of an exhaust catalyst in an exhaust line of an internal combustion engine which includes at least two points at which exhaust temperature values are determined during operation of the engine comprising:

determining first and second exhaust gas temperature values upstream and downstream respectively of at least a portion of the exhaust catalyst in the direction of exhaust gas flow;

filtering at least one of the first and second temperature values to eliminate short term fluctuations;

determining an actual temperature difference value from difference between the filtered temperature value and the other of the first and second temperature values;

generating a desired temperature difference value from a desired value characteristic map memory based upon the speed of the internal combustion engine, the exhaust gas temperature in the exhaust line and the fuel injection rate of the internal combustion engine;

filtering the desired temperature value to eliminate short term variations;

comparing the actual temperature difference value and the filtered desired temperature difference value;

generating a current time window value from a time characteristic map as a function of the exhaust-gas temperature; and triggering a monitoring signal when the comparison results in a filtered desired temperature difference value which is greater than the actual temperature difference value for a time at least as great as the value of the current time window value.

2. A process according to claim 1 including the step of determining whether the exhaust gas temperature has exceeded at least once a catalyst startup temperature value and preventing initiation of the monitoring process if it has not done so.

3. A process according to claim 1 including the step of ascertaining whether the exhaust gas temperature is below a catalyst shutdown temperature value and preventing initiation of the monitoring process if it is.

4. A process according to claim 1 including preventing initiation of the monitoring process of the filtered desired temperature difference value is below a predetermined temperature value.

5. A process according to claim 1 wherein the desired value characteristic map memory includes a desired value characteristic map supplied with engine speed and exhaust gas temperature values and a correction characteristic map supplied with engine speed and fuel injection rate values and including the step of multiplying the value read out from the desired characteristic map by the output value of the correction characteristic map.

6. A process according to claim 1 wherein the filtering of the desired temperature value is carried out by averaging over a time period which has a first filter time constant for desired temperature difference values with an increasing time characteristic and has a second filter time constant for desired temperature difference values with a decreasing time constant.

7. A process according to claim 6 wherein the second filter time constant is lower than the first filter time constant.

8. A process according to claim 1 including filtering both the first and the second exhaust gas temperature values to eliminate short term variations using a first filter time constant for increasing temperature values and a second filter time constant for decreasing temperature values.

9. A process according to claim 8 wherein the filter time constants used for filtering the first exhaust-gas temperature value are longer by a factor of at least 10 than the filter time constants used for filtering the second exhaust gas temperature value.

\* \* \* \* \*